(12) United States Patent
Payne et al.

(10) Patent No.: US 7,315,182 B2
(45) Date of Patent: Jan. 1, 2008

(54) CIRCUIT TO OBSERVE INTERNAL CLOCK AND CONTROL SIGNALS IN A RECEIVER WITH INTEGRATED TERMINATION AND COMMON MODE CONTROL

(75) Inventors: Robert Floyd Payne, Allen, TX (US); Bhavesh G. Bhakta, Richardson, TX (US); Richard Simpson, Bedford (GB)

(73) Assignee: Texas Instruments Incorporated, Dallas, TX (US)

( * ) Notice: Subject to any disclaimer, the term of this patent is extended or adjusted under 35 U.S.C. 154(b) by 779 days.

(21) Appl. No.: 10/778,455

(22) Filed: Feb. 13, 2004

(65) Prior Publication Data
US 2005/0249295 A1    Nov. 10, 2005

(51) Int. Cl.
*H03K 17/16* (2006.01)
*H03K 19/003* (2006.01)

(52) U.S. Cl. .......................... 326/22; 326/21; 326/30; 326/31

(58) Field of Classification Search ............ 326/21–23, 326/30
See application file for complete search history.

(56) References Cited

U.S. PATENT DOCUMENTS

| | | | |
|---|---|---|---|
| 6,529,036 B1* | 3/2003 | Rai .............................. | 326/30 |
| 6,556,052 B2* | 4/2003 | Garrett et al. ............... | 327/108 |
| 6,639,423 B2 | 10/2003 | Martin et al. | |
| 6,639,426 B2 | 10/2003 | Haycock et al. | |
| 6,768,334 B1* | 7/2004 | Yamauchi et al. ............. | 326/30 |
| 6,886,065 B2* | 4/2005 | Sides et al. .................. | 710/305 |
| 6,972,588 B1* | 12/2005 | Wong et al. ................... | 326/26 |
| 6,985,007 B2* | 1/2006 | Yamauchi et al. ............. | 326/30 |
| 7,012,447 B2* | 3/2006 | Yamauchi et al. ............. | 326/30 |
| 2002/0079926 A1 | 6/2002 | Haycock et al. | |
| 2003/0196150 A1 | 10/2003 | Linam et al. | |
| 2004/0124872 A1* | 7/2004 | Schoenborn et al. .......... | 326/30 |

* cited by examiner

*Primary Examiner*—Rexford Barnie
*Assistant Examiner*—Dylan White
(74) *Attorney, Agent, or Firm*—Alan K. Stewart; W. James Brady; Frederick J. Telecky, Jr.

(57) ABSTRACT

A serial data receiver circuit includes a pair of differential input nodes, and receiver circuitry and a termination circuit coupled between the differential input nodes. The termination circuit comprises a common mode node. A common mode control circuit is connected to the common mode node, and exhibits a substantially zero output impedance. In so doing, the common mode control circuit provides a common mode voltage to the common mode node of the termination circuit that exhibits substantially ideal termination of common mode signals and negligible loading on the differential input nodes. In another aspect, selection circuitry is provided that selectively passes single-ended or differential test signals to the differential input nodes during a test mode of operation. The selection circuitry facilitates observation of signals within the receiver circuitry.

15 Claims, 2 Drawing Sheets

CIRCUIT TO OBSERVE INTERNAL CLOCK AND CONTROL SIGNALS IN A RECEIVER WITH INTEGRATED TERMINATION AND COMMON MODE CONTROL

FIELD OF THE INVENTION

The present invention relates generally to the field of circuits, and more particularly relates to a differential input serial data receiver.

BACKGROUND OF THE INVENTION

As a result of the Internet's tremendous growth as well as the proliferation of various types of mobile communication devices, data transfers are increasing dramatically. In addition, data streams for digital video, high-definition television (HDTV), and color graphics are requiring higher and higher bandwidth. The digital communications deluge is the driving force for high-speed interconnects between chips, functional boards, and systems.

In computer and information processing systems, various integrated circuit chips must communicate digitally with each other over common buses. The receiving bus nodes recognize the signal as being high or low using receivers, which are also referred to as input buffers. Often the receiver is a differential receiver; that is a receiver that detects the difference between two input signals, referred to as the differential inputs. These input signals may be a received signal and a reference voltage or they may be a received signal and the inverse of the received signal. In either case, it is the difference between the two input signals that the receiver detects in order to determine the state of the received signal.

Interface circuits facilitate the serial transmission of digital information between a transmission source, such as a computer or a handheld mobile device, and a transmission destination, such as a modem, a printer, another computer, or another handheld mobile device. Interface circuits include transmission line drivers, which convert data signals of a first form (e.g., LVDS) into RS (recommended standard) signals that are transmitted on data transmission lines, and receivers, which convert the RS signals into data signals acceptable to a designated device (e.g., TTL). For high speed serial communications over electrical interconnections, controlled impedance transmission lines are used to maximize the available data rate. In order to minimize the impact of reflections on the received signal integrity, it is desirable to terminate the transmission lines at the receiver inputs with a termination that is matched to the characteristic impedance of the transmission line. For differential signaling, two modes of operation exist for the received signals, the differential and common mode. Differential signaling refers to the difference between two signals carrying equivalent but complementary data on a pair of matched impedance transmission lines. Common mode signals refer to a signal that is received simultaneously on both of the differential inputs. These common mode signals can be caused by noise or crosstalk injected onto both of the differential transmission lines. For maximum signal integrity, it is desirable for both the differential and common mode signals to be properly terminated at the differential inputs.

SUMMARY OF THE INVENTION

The following presents a simplified summary in order to provide a basic understanding of one or more aspects of the invention. This summary presents one or more concepts of the invention in a simplified form as a prelude to the more detailed description that is presented later and is not an extensive overview of the invention. In this regard, the summary is not intended to identify key or critical elements of the invention, nor does the summary delineate the scope of the invention.

The present invention relates to a serial data receiver circuit that is operable, at least in one example, to facilitate observation of internal clock and control signals using the input nodes of the receiver as an output.

According to one aspect of the present invention, a serial data receiver circuit comprises a pair of differential input nodes with receiver circuitry and a termination circuit coupled therebetween. The termination circuit ideally matches the characteristic differential impedance of the controlled impedance transmission line used to deliver serial data to the receiver. The circuit further comprises a common mode control circuit connected to a common mode node of the termination circuit. This circuit is employed to establish the voltage on the common node to be within the common mode range of the differential input nodes when the receiver is AC-coupled. The common mode control circuit exhibits a substantially zero output impedance and consequently provides a common mode reference voltage for the circuit and a termination point for common mode signals incident on the differential input nodes. For example, for purely differential signals, the input voltages on the differential input nodes move in opposite directions. Current is therefore concurrently injected into one of the input nodes and equal current is pulled from the other node. The net current into the common node is zero. For common mode signals, current is either injected or pulled from both differential inputs, therefore injecting (or pulling) a net current to (from) the common node. This results in the voltages at the common node and the differential inputs to change when common mode signals are received, resulting in reduced signal integrity of the received signal due to reflections of the common mode signal and non-ideal common mode rejection of the receiver differential inputs. In one example, the common mode control circuit comprises a unity gain configuration operational amplifier.

According to another aspect of the present invention, a serial data receiver circuit comprises a pair of differential input nodes, with receiver circuitry and a termination circuit coupled therebetween. An operational amplifier has an output coupled to a common mode node of the termination circuit, and an input coupled to a selection circuit. The selection circuit receives a plurality of single-ended inputs associated with test nodes in the receiver circuitry, as well as an input associated with the common mode reference voltage. The selection circuit is operable to selectively pass one of the plurality of test node signals to the operational amplifier input in a test mode of operation, and selectively pass the common mode reference voltage in an operation mode based on one or more selection signals associated therewith. In one example, the selection circuit comprises a multiplexer.

According to still another aspect of the present invention, a serial data receiver circuit comprises a pair of differential input nodes, with receiver circuitry and a termination circuit coupled therebetween. The receiver circuit further comprises a differential transistor pair, wherein each transistor of the differential pair is coupled to one of the differential input nodes, respectively. The circuit also comprises a selection circuit having a plurality of inputs associated with differential test nodes in the receiver circuitry, and two outputs, wherein each of the outputs of the selection circuit is coupled to one of the control terminals of the differential transistor pair. In operation, the differential transistor pair is operable to substantially buffer the outputs of the selection circuit representing the differential test nodes onto the differential input nodes during a test mode of operation.

In yet another aspect of the present invention, a serial data receiver circuit comprises both an operational amplifier/selection circuit combination and a differential transistor pair/selection circuit combination. In the above manner, single-ended signals such as analog test signals can be viewed using the operational amplifier, and differential test signals such as clock or control signals can be viewed using the differential transistor pair in a test mode of operation on the differential input nodes. Consequently, various test nodes within the receiver circuitry can be evaluated in a test mode without special bond or probe pads associated therewith.

To the accomplishment of the foregoing and related ends, the invention comprises the features hereinafter fully described and particularly pointed out in the claims. The following description and the annexed drawings set forth in detail certain illustrative aspects and implementations of the invention. These are indicative, however, of but a few of the various ways in which the principles of the invention may be employed. Other objects, advantages and novel features of the invention will become apparent from the following detailed description of the invention when considered in conjunction with the drawings.

DETAILED DESCRIPTION OF THE INVENTION

The present invention will now be described with respect to the accompanying drawings in which like numbered elements represent like parts. The figures provided herewith and the accompanying description of the figures is merely provided for illustrative purposes. One of ordinary skill in the art should realize, based on the instant description, other implementations and methods for fabricating the devices and structures illustrated in the figures and in the following description.

The present invention is directed to a serial data receiver circuit that exhibits reduced loading on the differential inputs associated with a common mode reference voltage provided by a termination circuit. In another aspect of the invention, a serial data receiver circuit is provided that facilitates observation of internal digital or analog signals associated with test nodes within the receiver circuitry, wherein such signal observation takes place on one or more of the differential inputs nodes of the circuit.

Figure 1:
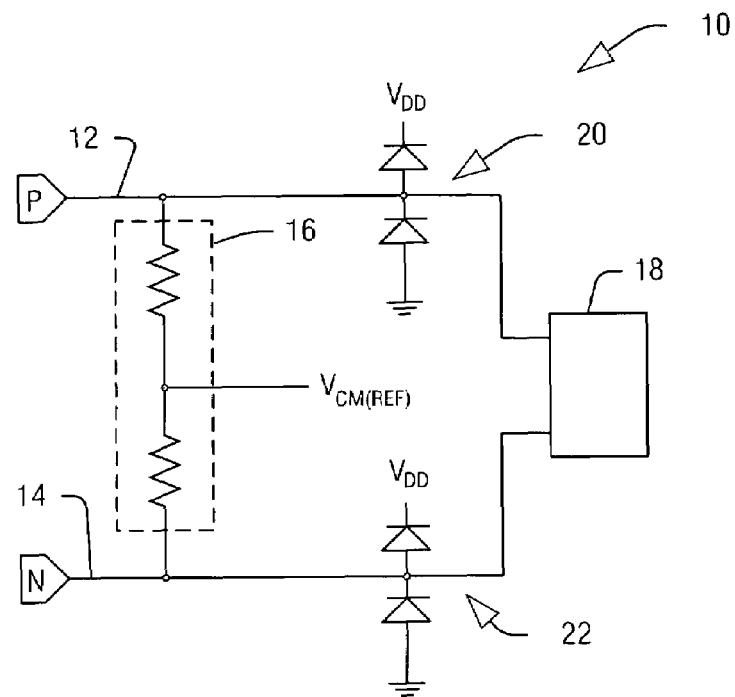
FIG. 1 is a prior art schematic diagram illustrating a typical differential serial data receiver.

Turning initially to prior art FIG. 1, a conventional differential input serial data receiver circuit 10 is illustrated. The circuit 10 includes a pair of differential input nodes 12, 14 with a termination circuit 16 and receiver circuitry 18 coupled therebetween. The serial data receiver circuit 10 further includes electrostatic discharge (ESD) protection circuitry 20, 22 associated with each of the differential inputs 12, 14. As is generally understood, the ESD circuitry 20, 22 operates to protect the receiver circuitry 18 from any voltage spikes that may occur on the differential input nodes 12, 14 due to electrostatic discharge, by shunting such spikes to either $V_{DD}$ or circuit ground.

In operation, the termination circuit 16 operates to provide impedance matching (e.g., 50 ohms) for the inputs 12, 14. A common mode reference voltage ($V_{CM(REF)}$) is provided to a common mode node of the termination circuit 16 in order to provide the common mode voltage about which the differential signals at the inputs 12, 14 vary when the receiver inputs are AC-coupled. Typically, or conventionally, the common mode reference voltage is provided using a voltage divider type circuit (not shown) coupled directly to the common mode node, wherein such circuitry provides a high output impedance, thereby undesirably terminating any common mode signals received at the differential inputs 12, 14. Ideally the common mode and differential termination should match the characteristic impedance of the transmission line driving the inputs. This high output impedance results in a non-ideal termination of any common mode signals introduced at the differential inputs 12, 14. Such non-ideal termination loading is highly disadvantageous, wherein high frequency, low voltage differential serial input data is present on the inputs and such loading causes input signal degradation.

Figure 2:
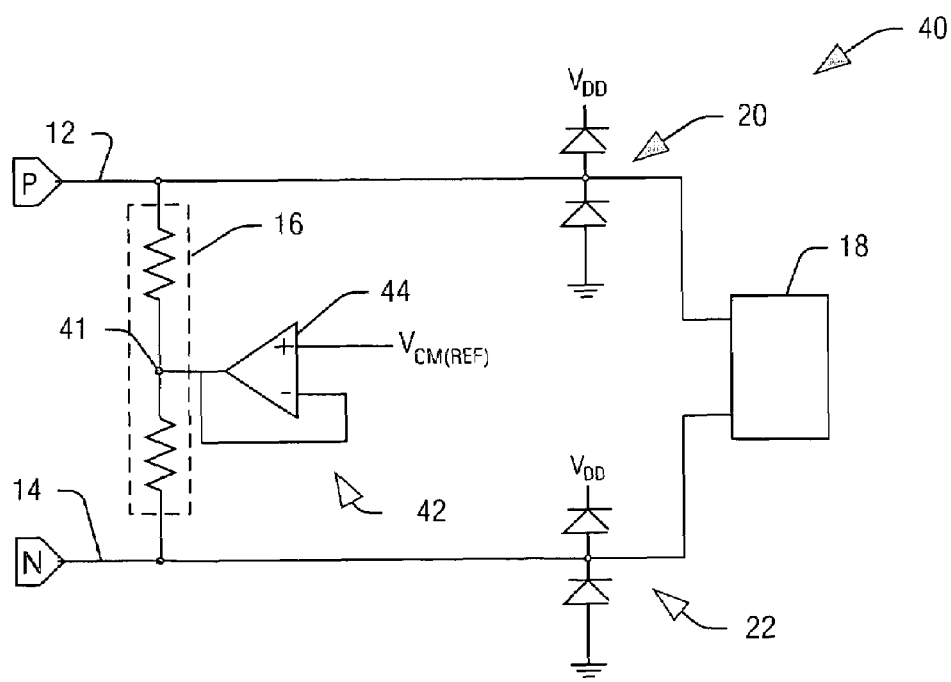
FIG. 2 is a schematic diagram illustrating a differential serial data receiver circuit according to one aspect of the present invention.

Referring now to FIG. 2, a schematic diagram illustrating a differential input serial data receiver circuit 40 is provided according to the present invention. The receiver circuit 40 comprises a pair of differential input nodes 12, 14 with a termination circuit 16 and receiver circuitry 18 coupled therebetween. In one example, the termination circuit 16 comprises a pair of serially connected resistors having a common mode node 41 situated therebetween. Alternatively, any circuitry providing an impedance matching (e.g., 50 ohms) for the differential inputs 12, 14 may be employed and is contemplated as falling within the scope of the present invention. In addition, similar to the circuit 10 of FIG. 1, ESD circuitry 20, 22 may be employed, connected to the differential inputs 12, 14 for protection thereof.

Still referring to FIG. 2, the common mode control circuit 44 further comprises an input coupled to a common mode reference voltage ($V_{CM(REF)}$) and an output coupled to the common mode node 41 of the termination circuit 16. The common mode control circuit 42 exhibits approximately a zero output impedance, and thus provides a voltage to the common mode node 41 that is associated with the common mode reference voltage ($V_{CM(REF)}$) while providing a more ideal termination to common mode signals on the differential inputs 12, 14. In one example, the common mode control circuit 42 comprises a unity gain configuration operational amplifier 44 that substantially buffers the common mode reference voltage ($V_{CM(REF)}$) to the common mode node 41, and exhibits approximately a zero output impedance. Alternatively, however, any circuitry that exhibits an extremely low output impedance and passes a voltage associated with the common mode reference voltage may be employed and is contemplated as falling within the scope of the present invention. One example of this might be a voltage regulator. For negligible impact on the received signal integrity, any circuit that controls the output common mode with an impedance approaching $\frac{1}{10}^{th}$ of the termination resistance 16 is typically sufficient to provide good common mode termination. In addition, if the common mode impedance of the differential transmission lines driving the differential inputs 12, 14 is higher than the termination resistance 16, then the output impedance of the common mode control circuit can be adjusted to provide a closer match. In the above manner, a common mode reference voltage is provided at node 41 for the differential input data to vary about, and the provision of such common mode voltage provides better termination to the input data, thereby substantially reducing signal degradation due to reflections caused by non-ideal termination.

Figure 3:
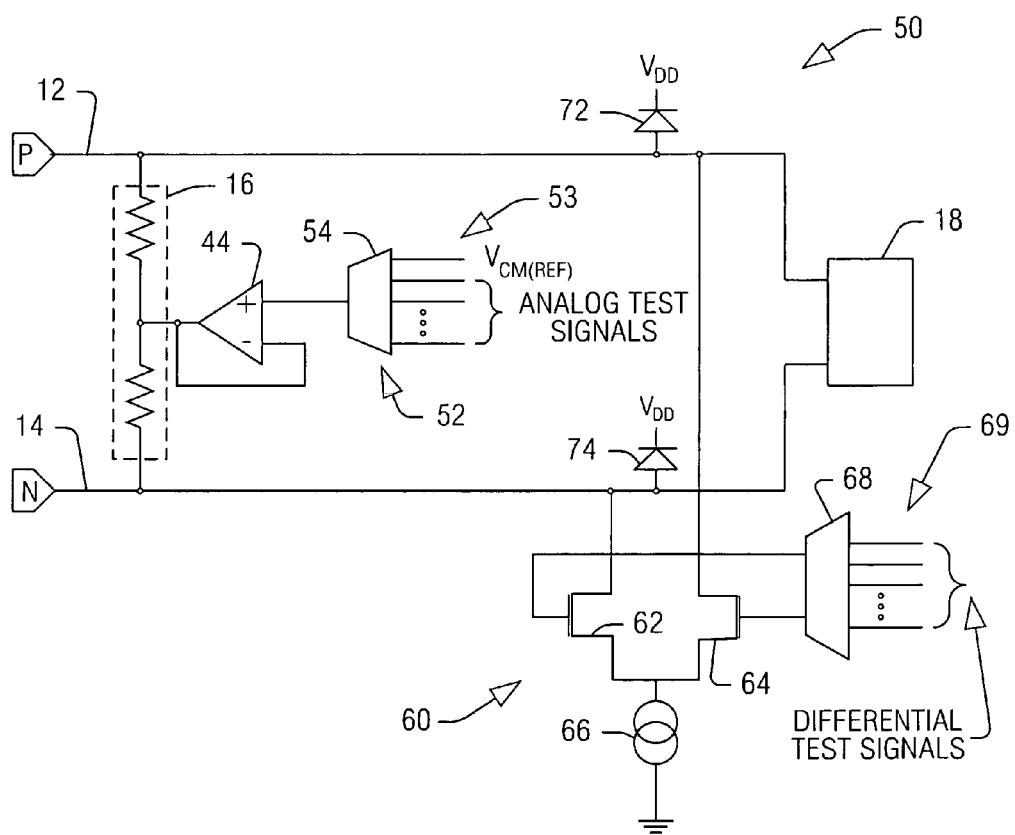
FIG. 3 is a schematic diagram illustrating a differential serial data receiver circuit according to another aspect of the present invention.

Referring now to FIG. 3, a differential serial data receiver circuit according to another aspect of the present invention is illustrated, and is designated at reference numeral 50. The receiver circuit 50 comprises a pair of differential input nodes 12, 14 with a termination circuit 16 and receiver circuitry coupled therebetween. An exemplary single gain configuration operational amplifier 44 has an output coupled to a common mode node 41 of the termination circuit 16, and an input of the operational amplifier 44 is coupled to an output of a selection circuit 52.

The selection circuit 52 is operable to selectively pass one of a plurality of signals 53 to the common mode node 41 through the operational amplifier based on one or more control signals (not shown). For example, in a normal operation mode, the selection circuit 52 selectively passes a common mode reference voltage signal ($V_{CM(REF)}$) to set the common mode voltage at node 41. In addition, in the operation mode, the operational amplifier 44 operates to provide ideal common mode termination on the differential input nodes 12, 14 due to its approximately zero output impedance, as discussed supra. Alternatively, in a test mode of operation, the selection circuit 52 selectively passes one of a plurality of test signals associated with test nodes within the receiver circuitry 18.

In the above manner, test nodes within the receiver circuitry 18 can be easily monitored at one or both differential inputs 12, 14 without requiring additional bond pads and/or test pins. For example, single-ended analog test signals may be easily evaluated at a plurality of nodes successively by altering the control signal(s) associated with the selection circuit 52. Analog signals are, in one example, ideal for analysis with the above circuitry because, in many cases, one is typically interested in the voltage levels of the signals rather than the speed thereof. Since a sense apparatus at one or both of the differential input nodes 12, 14 typically is a high impedance load, the resistance associated with the termination circuit 16 has negligible impact on the voltage levels. A single-ended signal can be monitored at one or both differential inputs 12, 14 as may be desired. In one example, the voltage level at both inputs 12, 14 can be sensed and averaged.

In the above example, the selection circuit 52 comprises a multiplexer 54, however, any circuitry that selectively passes one of a plurality of signals to the common mode node 41 may be employed, and any such circuitry is contemplated as falling within the scope of the present invention. In addition, in the above example, the operational amplifier 44 is configured as a unity gain amplifier. This configuration is advantageous because it behaves substantially as a buffer in transmitting the signals 53 to one or both outputs 12, 14. Alternatively, the operational amplifier 44 may be configured so that the gain is not unity, and compensation can then be employed to compensate for any offset associated therewith, as may be desired. Therefore alternative operational amplifier implementations may be employed and are contemplated as falling within the scope of the present invention.

In accordance with another aspect of the present invention, the serial data receiver circuit 50 further comprises a differential transistor pair 60 wherein each transistor 62, 64 of the pair is connected to one of the differential input nodes 12, 14, for example, as illustrated. Each transistor 62, 64 of the differential transistor pair 60 are also coupled to a current source 66 or similar circuitry, as illustrated. In addition, each of the transistors 62, 64 have a control terminal coupled to an output of a selection circuit 68. The selection circuit 68 receives test signals 69 (e.g., differential or single-ended) from a plurality of test nodes within the receiver circuitry 18 and selectively passes such signals to the differential transistors 62, 64.

The differential transistors 62, 64 operate as a buffer to generate a signal on the differential input nodes 12, 14 that is a function of the signals at the control terminals of the transistors. For example, for a differential signal at a pair of internal test nodes, the differential signal is selected using one or more control signals (not shown) of the selection circuit 68, which then passes the differential signal to the control terminals of the differential transistor pair. Based on the states of the differential signals, the transistors 62, 64 turn on or turn off, respectively, thereby pulling up or down, respectively, the differential inputs nodes 12, 14 that are connected thereto. Consequently, a differential signal is generated on the differential input nodes that is related to the differential signal output from the selection circuit 68. The above circuitry, for example, is ideal for testing high-speed differential test signals (e.g., digital signals such as a clock or control signals), where one is interested in speed issues, for example, edge placement and timing. Alternatively, however, any differential signals may be evaluated with the above circuitry of the present invention, for example, analog differential signals to evaluate the monotonicity of a digital-to-analog converter within the receiver circuitry 18.

In addition, the differential transistor pair circuitry 60 may be further utilized in providing electrostatic discharge protection. For example, instead of two series connected diodes employed for ESD protection, as illustrated in prior art FIG. 1, an ESD circuit 70 is employed in which a single diode 72, 74 is coupled between each differential input node 12, 14 and a supply voltage $V_{DD}$, while the second portion of protection to ground (a diode) is provided by the drain-to-well diffusion of each transistor 62, 64 in the differential transistor pair 60 when NMOS type transistors are employed for the differential transistor pair. Thus, ESD protection is integrated into the differential transistor pair 60, thereby saving die area and minimizing the additional capacitive loading at 12, 14 by avoiding need to add two additional diodes.

It should be noted in the above example that the selection circuit 68 comprises a multiplexer, however, other types of selection circuitry may be employed and are contemplated as falling within the scope of the present invention. In addition, while the transistors 62, 64 of the differential transistor pair 60 in the present example comprise NMOS type transistors, PMOS or bipolar transistors may alternatively be employed and are contemplated as falling within the scope of the present invention.

Although the invention has been shown and described with respect to a certain aspect or various aspects, it is obvious that equivalent alterations and modifications will occur to others skilled in the art upon the reading and understanding of this specification and the annexed drawings. In particular regard to the various functions performed by the above described components (assemblies, devices, circuits, etc.), the terms (including a reference to a "means") used to describe such components are intended to correspond, unless otherwise indicated, to any component which performs the specified function of the described component (i.e., that is functionally equivalent), even though not structurally equivalent to the disclosed structure which performs the function in the herein illustrated exemplary embodiments of the invention. In addition, while a particular feature of the invention may have been disclosed with respect to only one of several aspects of the invention, such feature may be combined with one or more other features of the other aspects as may be desired and advantageous for any given or particular application. Furthermore, to the extent that the term "includes" is used in either the detailed description or the claims, such term is intended to be inclusive in a manner similar to the term "comprising."

What is claimed is:

1. A serial data receiver circuit, comprising:
   a pair of differential input nodes;
   receiver circuitry coupled to the differential input nodes;
   a termination circuit coupled between the differential input nodes, the termination circuit comprising a common mode node; and
   an operational amplifier circuit having an input and an output, wherein the output is coupled to the common mode node of the termination circuit; and
   a selection circuit having a plurality of inputs associated with test nodes in the receiver circuitry, and an input associated with a common mode reference voltage, and an output coupled to the input of the operational amplifier, wherein the selection circuit is operable to pass a signal associated with one of the plurality of test nodes or the common mode reference voltage based on one or more selection signals associated therewith.

2. The serial data receiver circuit of claim 1, wherein the selection circuit comprises a multiplexer circuit.

3. The serial data receiver circuit of claim 1, wherein in an operational mode, the selection circuit passes the common mode reference voltage to the operational amplifier, and wherein the operational amplifier outputs a voltage to the common mode node of the termination circuit that is a function of the common mode reference voltage.

4. The serial data receiver circuit of claim 3, wherein the operational amplifier is configured in a unity gain configuration such that the voltage at the common mode node is substantially equal to the common mode reference voltage.

5. The serial data receiver circuit of claim 1, wherein in a test mode, the selection circuit passes a signal associated with one of the plurality of test nodes to the input of the operational amplifier, and wherein the operational amplifier outputs a voltage to the common mode node of the termination circuit that is a function of the signal voltage.

6. The serial data receiver circuit of claim 5, wherein the operational amplifier is configured in a unity gain configuration such that the voltage at the common mode node is substantially equal to the common mode reference voltage.

7. The serial data receiver circuit of claim 5, wherein the termination circuit comprises a pair of serially coupled resistors, where a node between the serially coupled resistors comprises the common mode node, and wherein the voltage output to the common mode node of the termination circuit is substantially reproduced at each of the differential input nodes as a single ended test node output voltage.

8. A serial data receiver circuit, comprising:
   a pair of differential input nodes;
   receiver circuitry coupled to the differential input nodes;
   a termination circuit coupled between the differential input nodes, the termination circuit comprising a common mode node;
   a differential transistor pair, each transistor of the differential transistor pair coupled to one of the differential input nodes, respectively; and
   a selection circuit having a plurality of inputs associated with differential test nodes in the receiver circuitry, and two outputs each coupled to respectively control terminals of the differential transistor pair, wherein the selection circuit is operable to pass a differential signal associated with two of the plurality of differential test nodes based on one or more selection signals associated therewith.

9. The serial data receiver circuit of claim 8, wherein the differential transistor pair comprises MOS transistors having source terminals connected together, drain terminals coupled to the respective differential input nodes, and gate terminals comprising the control terminals coupled to the respective outputs of the selection circuit.

10. The serial data receiver circuit of claim 9, further comprising a current source circuit coupled between the source terminals of the MOS transistors and a circuit ground potential.

11. The serial data receiver of claim 9, wherein the selection circuit comprises a multiplexer circuit.

12. The serial data receiver of claim 9, further comprising an electrostatic discharge protection circuit connected to the differential input nodes.

13. The serial data receiver circuit of claim 12, wherein the electrostatic discharge protection circuit comprises two pair of series connected diode extending between a supply voltage and a circuit ground potential, wherein a connection node between each pair of series connected diodes respectively coupled to one of the pair of differential input nodes.

14. The serial data receiver of claim 13, wherein one diode in each pair of series connected diodes is formed within a layout of the MOS transistor pair.

15. A serial data receiver circuit comprising:
    a pair of differential input nodes;
    receiver circuitry coupled to the differential input nodes;
    a termination circuit coupled between the differential input nodes, the termination circuit comprising a common mode node;
    a common mode control circuit connected to the common mode node, the common mode control circuit having a substantially zero output impedance, wherein the common mode control circuit provides a common mode voltage to the common mode node of the termination circuit that exhibits substantially negligible loading on the differential input nodes and properly terminates any common mode signals at the differential input nodes;
    a differential transistor pair, each transistor of the differential transistor pair coupled to one of the differential input nodes, respectively; and
    a selection circuit having a plurality of inputs associated with differential test nodes in the receiver circuitry, and two outputs each coupled to respectively control terminals of the differential transistor pair, wherein the selection circuit is operable to pass a differential signal associated with two of the plurality of differential test nodes based on one or more selection signals associated therewith.

* * * * *